United States Patent [19]

Pandalai et al.

[11] Patent Number: 5,685,157
[45] Date of Patent: Nov. 11, 1997

[54] ACOUSTIC DAMPER FOR A GAS TURBINE ENGINE COMBUSTOR

[75] Inventors: Raghavan P. Pandalai, Cincinnati; Bruce A. Carter, West Chester; Horst W. W. Hehmann, Cincinnati, all of Ohio

[73] Assignee: General Electric Company, Cincinnati, Ohio

[21] Appl. No.: 451,820

[22] Filed: May 26, 1995

[51] Int. Cl.$^6$ .............................................. F02C 7/24
[52] U.S. Cl. ............................................ 60/725; 431/114
[58] Field of Search ........................ 60/725, 737; 431/114

[56] References Cited

U.S. PATENT DOCUMENTS

| | | | |
|---|---|---|---|
| 2,807,931 | 10/1957 | Bodine | 60/725 |
| 3,601,985 | 8/1971 | Bauger . | |
| 3,850,261 | 11/1974 | Hehmann . | |
| 4,122,674 | 10/1978 | Andersson et al. . | |
| 4,150,732 | 4/1979 | Hoch et al. . | |
| 4,199,936 | 4/1980 | Cowan et al. . | |
| 4,244,441 | 1/1981 | Tolman . | |
| 4,557,106 | 12/1985 | Williams et al. . | |
| 4,944,362 | 7/1990 | Motsinger et al. . | |
| 4,974,568 | 12/1990 | Cser . | |
| 5,345,768 | 9/1994 | Washam et al. | 60/737 |
| 5,373,695 | 12/1994 | Aigner et al. . | |

*Primary Examiner*—Michael Koczo
*Attorney, Agent, or Firm*—Andrew C. Hess; Wayne O. Traynham

[57] ABSTRACT

An apparatus for suppressing or attenuating acoustic pressure oscillations in a gas turbine engine combustor, the apparatus having a quarter wave resonator with a cavity closed at a first end and open at a second end and a characteristic length that reflects waves 180 degrees out of phase with the incoming waves and a viscous damper at the open end of the cavity. At least one resonating tube with a closed end and an open end and a single cavity therebetween, a damping plate with a plurality of apertures therethrough disposed across the open end, and a means for mounting the tube on the engine so that the damping plate is essentially flush with the wall. The apertures preferably have a total open area that is about 8% of an inclusive area of the open end and the tube may be cylindrical and the apertures circular. The tube preferably has a centerline through the cavity with a characteristic length extending from the closed end to the damping plate wherein the characteristic length is essentially equal to a quarter of a wavelength of an acoustic pressure oscillation produced in the combustor having a predetermined acoustic frequency.

20 Claims, 5 Drawing Sheets

ACOUSTIC DAMPER FOR A GAS TURBINE ENGINE COMBUSTOR

BACKGROUND OF THE INVENTION

1. Field of the Invention

The present invention relates to acoustic damping for a gas turbine engine combustor, and, more particularly, to an acoustic damping apparatus to control dynamic pressure pulses in a gas turbine engine combustor using a viscous damper at an open end of a resonating tube.

2. Discussion of the Background Art

Destructive acoustic pressure oscillations or pressure pulses may be generated in combustors of gas turbine engines as a consequence of normal operating conditions depending on fuel-air stoichiometry, total mass flow, and other operating conditions. The current trend in gas turbine combustor design towards low NOx emissions required to meet federal and local air pollution standards has resulted in the use of lean premixed combustion systems in which fuel and air are mixed homogeneously upstream of the flame reaction region. The fuel-air ratio or the equivalence ratio at which these combustion systems operate are much "leaner" compared to more conventional combustors in order to maintain low flame temperatures which in turn limits production of unwanted gaseous NOx emissions to acceptable levels. Although this method of achieving low emissions without the use of water or steam injection is widely used, the combustion instability associated with operation at low equivalence ratio also tends to create unacceptably high dynamic pressure oscillations in the combustor which can result in hardware damage and other operational problems. Pressure pulses can have adverse effects on an engine, including mechanical and thermal fatigue to combustor hardware. The problem of pressure pulses has been found to be of even greater concern in low emissions combustors since a much higher content of air is introduced to the fuel-air mixers in such designs.

Aircraft engine derivative annular combustion systems with their short compact combustor design have been observed to produce complex predominant acoustic pressure oscillation modes in the combustor. The complex modes are characterized as having a circumferential mode coupled with standing axial oscillation modes between the two reflecting surfaces. Each of the two reflecting surfaces is located at an end of the combustor corresponding to compressor outer guide vanes (OGV) and a turbine nozzle inlet. This creates high dynamic pressure oscillations across the entire combustion system.

Several attempts have been made to eliminate, prevent, or diminish the acoustic pressures produced by such dynamic pressure pulses in gas turbine engine combustors. One method has been to elevate flame temperatures, which has achieved moderate success. However, elevating flame temperature is clearly contrary to the goals of low emissions in modern combustors since a relatively low temperature band is preferred. Moreover, it has been found that elevating the flame temperature in a combustor has an undesirable effect on the liners thereof.

Another proposed system has been to utilize an asymmetric compressor discharge pressure bleed. In this system, it is believed that pressure pulses in the combustor take the form of a circumferential pulse located adjacent to the combustion chamber. However, it has been found that pressure pulses within the combustor travel not only in a circumferential manner, but also in an axial manner. More specifically, pulses originating in the combustion chamber travel therein and then are reflected back through the fuel-air mixers into the cold section of the combustor. Therefore, the asymmetric compressor discharge pressure bleed has been found to be unsuccessful in effectively combating pressure pulses in the combustor.

Still another method of counteracting pressure pulses within a gas turbine engine combustor has been the use of detuning tubes positioned at the upstream side of the combustor. These detuning tubes extend into the combustor by a predetermined amount and are effective at balancing out pressure pulses having a fixed amplitude and frequency. Nevertheless, it has been found that pressure pulses within a combustor are dynamic with changing amplitudes and frequencies. Thus, the aforementioned detuning tubes have met with only a moderate degree of success.

Active acoustic or pressure oscillation control systems have also been suggested to solve the problem. One such idea is disclosed in U.S. Pat. No. 5,575,144, which provides an apparatus for actively controlling dynamic pressure pulses in a gas turbine engine combustor and includes a means for sensing pressure pulses in the combustor, a first processing means for determining the amplitude and frequency for a predominant pressure pulse of the sensed pressure pulses, a second processing means for calculating an amplitude, a frequency, and a phase angle shift for a cancellation pulse to offset the predominant pressure pulse, and an air bleed means for periodically extracting metered volumes of air from the combustor to produce the cancellation pulse, wherein the air bleed means is controlled by the second processing means. Such a system is complex, has many movable parts, that are subject to wear and break down thus requiring repair or replacement. Operators and manufacturers prefer to use less complex methods.

It is highly desirable to have a static means for eliminating or reducing these high dynamic pressure oscillations in a gas turbine engine combustor particularly one that has a short length and is designed for low NOx (nitrous oxides), CO, and unburnt hydrocarbon emissions. It is also highly desirable to develop such an apparatus that can eliminate, prevent, or diminish complex mode acoustic pressure oscillations having different amplitudes and frequencies and that does not have any adverse effect on the emissions of the combustor.

SUMMARY OF THE INVENTION

An apparatus for suppressing or attenuating acoustic pressure oscillations in a gas turbine engine combustor having a quarter wave resonator with a cavity closed at a first end and open at a second end and a characteristic length that reflects waves 180 degrees out of phase with the incoming waves and a viscous damper at the open end of the cavity. A more particular embodiment of the present invention is an apparatus for attenuating acoustic pressure oscillations of a gas flow contained in part by a combustor wall of a gas turbine engine combustor. The apparatus has at least one resonating tube with a closed end and an open end and a single cavity therebetween, a damping plate with a plurality of apertures therethrough disposed across the open end, and a means for mounting the tube on the engine so that the damping plate is essentially flush with the wall. A more particular embodiment provides that the apertures have a total open area that is about 8% of an inclusive area of the open end where the damping plate is disposed. The tube may be cylindrical and the apertures circular. The tube and cavity preferably have a centerline with a characteristic length extending from the closed end to the damping plate wherein the characteristic length is essentially equal to a quarter of a wavelength of an acoustic pressure oscillation produced in the combustor having a predetermined acoustic frequency.

The resonating tube may be bent but preferably no more than 40 degrees. The apparatus of the present invention may be an assembly having two or more of such resonating tubes and the mounting means may be a mounting plate supporting two or more of the resonating tube disposed through the mounting plate and the mounting plate is adapted to be bolted to a boss on the engine.

The present invention as found in a more particular embodiment is a combustor for a gas turbine engine disposed between a diffuser outlet downstream of a compressor outlet guide vane stage and a turbine inlet guide vane stage. The combustor includes an outer annular casing radially spaced apart from an annular inner casing and a combustion chamber therebetween, a combustor inlet at the diffuser outlet and a combustor outlet at the turbine inlet, a plurality of air/fuel mixture injectors annularly disposed between the casings and axially between the combustor inlet and the combustor outlet, and an annularly disposed plurality of the resonating tubes disposed around the combustion chamber. The plurality of tubes has sets of the tubes and each tube within each set has a straight centerline with a characteristic length extending from the closed end to the damping plate, the characteristic length being essentially equal to a predetermined quarter of a wavelength of an acoustic pressure oscillation produced in the combustor and having a predetermined acoustic frequency, and each set of tubes has a different characteristic length. The mounting means may also be a mounting plate having more than one of the resonating tubes mounted therethrough and the mounting plate can be adapted to be bolted to a boss on the engine.

ADVANTAGES OF THE INVENTION

One advantage of the present invention is that it provides superior attenuation of high pressure acoustic pressure oscillations or noise as compared to similar static devices of the prior art designed to attenuate such acoustic pressure oscillations. The apparatus of the present invention provides mutual destructive interference between the incoming and reflected waves in the resonating tube which when coupled with the viscous damping device at the open end of the tube provides superior attenuation of unwanted acoustic pressure oscillations. The present invention also allows for such attenuation of different acoustic pressure oscillations having different frequencies and wavelengths. The attenuation of the present invention is accomplished without the use of complex and expensive actively controlled systems and with no moving parts. Thereby having the advantage of being less complex and inexpensive to produce, operate, and maintain.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
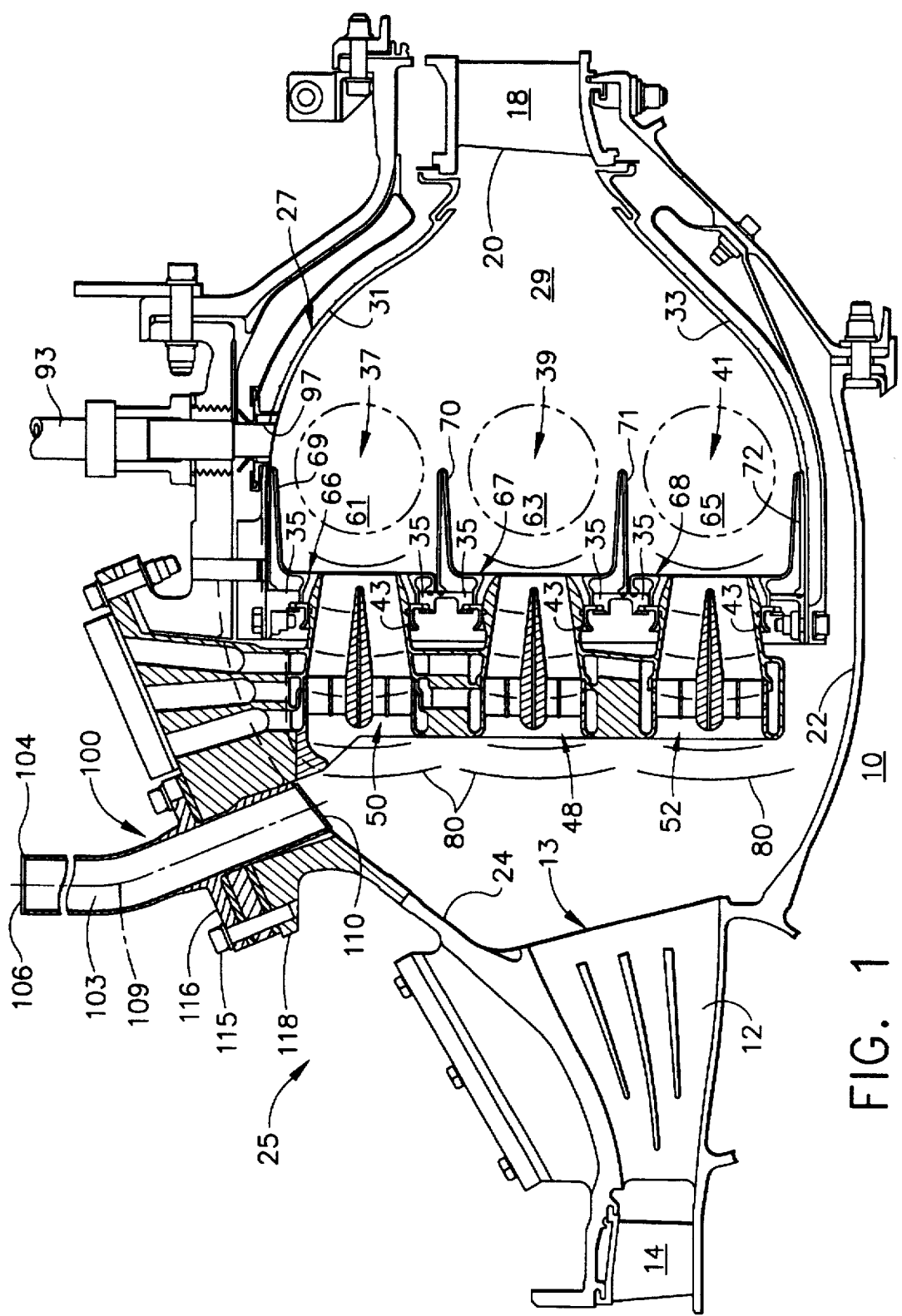
FIG. 1 is a longitudinal cross-sectional view through a combustor section of an aircraft derivative industrial type gas turbine engine including the acoustic pressure oscillation attenuating apparatus of the present invention.

Referring now to the drawings in detail, wherein identical numerals indicate the same elements throughout the figures, FIG. 1 illustrates a combustion section or combustor 10 disposed between a diffuser 12, the diffuser 12 having a diffuser outlet 13 which is downstream of a stage of compressor outlet guide vanes 14, and a stage of turbine inlet guide vanes 18 having a turbine inlet 20. The combustor 10 of the type suitable for use in a gas turbine engine and in particular for a low NOx marine/industrial gas turbine engine. Combustor 10 is a triple annular combustor designed to produce low emissions as described in more detail in U.S. Pat. No. 5,323,604, also owned by the assignee of the present invention and hereby incorporated by reference. The combustor 10 has an inner casing 22 spaced radially inward of an outer casing 24 between which is disposed a hollow body 27 defining a combustion chamber 29 therein. The hollow body 27 is generally annular in form and includes an outer liner 31, an inner liner 33, and a domed end referred to, in the industry, as a dome 35. It should be understood, however, that the present invention is not limited to such an annular configuration and may well be employed with equal effectiveness in a combustion apparatus of the well known cylindrical can or cannular type. Moreover, while the present invention is shown as being utilized in a triple annular combustor, it may also be utilized in a single or double annular design or others as they are developed.

More specifically, as described in U.S. Pat. No. 5,323,604, triple annular combustor 10 includes an outer dome 37, a middle dome 39, and an inner dome 41. Air/fuel carburation of fuel, which is injected into the combustor by fuel injectors (not show), is accomplished by middle, outer, and inner fuel/air mixers 48, 50 and 52 respectively which are correspondingly disposed in openings 43 of middle dome 39, outer dome 37 and inner dome 41, respectively. Heat shields 66, 67 and 68 are provided to segregate the individual primary combustor zones 61, 63 and 65, respectively. It will be seen that heat shield 66 includes an annular centerbody 69 to help insulate outer liner 31 from flames burning in primary zone 61. Heat shield 67 has annular centerbodies 70 and 71 to segregate primary zone 63 from primary zones 61 and 65, respectively. Heat shield 68 has an annular centerbody 72 in order to insulate inner liner 33 from flames burning in primary zone 65.

It will be understood that dynamic pressure pulses or acoustic pressure oscillations associated with the operation of combustor 10 impose excessive mechanical stress on the gas turbine engine. For example, acoustic pressure oscillations identified by the numeral 80 originate in the individual primary combustor zones 61, 63 and 65, respectively and are reflected off the stage of turbine inlet guide vanes 18 back upstream through the relatively open flow swirl mixers 48, 50 and 52. The acoustic pressure oscillations 80 are then reflected downstream through the diffuser 12 and off of the stage of compressor outlet guide vanes 14 thus establishing a feedback loop which produces the dynamic pressure or acoustic oscillations. This has, among several undesirable effects, the effect of cracking heat shields 66, 67 and 68. One of the reasons that this dynamic pressure or acoustic oscillation effect appears to be so strong is the short compact design of the combustor 10. The current trend in gas turbine combustor design towards low NOx emissions required to meet federal and local air pollution standards has resulted in the use of premixed combustion systems, wherein fuel and air are mixed homogeneously upstream of the flame reaction region using the relatively open flow type of swirl mixers 48, 50 and 52 which establishes a feedback loop which in turn permits the acoustic oscillations or their pressure waves to bounce back and forth between the stage of turbine inlet guide vanes 18 and the stage of compressor outlet guide vanes 14, essentially unimpeded, and through the entire length of the combustor 10. The fuel-air ratio or the equivalence ratio at which these combustion systems operate are much "leaner" compared to conventional combustors to maintain low flame temperatures to limit the gaseous NOx emissions to the required level. Although this method of achieving low emissions without the use of water or steam injection is widely used, the combustion instability associated with operation at low equivalence ratio also creates unacceptably high dynamic pressure oscillations in the combustor resulting in hardware damage and other operational problems. To this end the present invention, an apparatus 100 for suppressing or attenuating the pressure pulses from acoustic pressure oscillations 80 within combustor 10 was developed. The apparatus 100 has been found to be effective when positioned between the diffuser outlet 13 and the fuel/air mixers 48, 50 and 52.

Figures 2, 3:
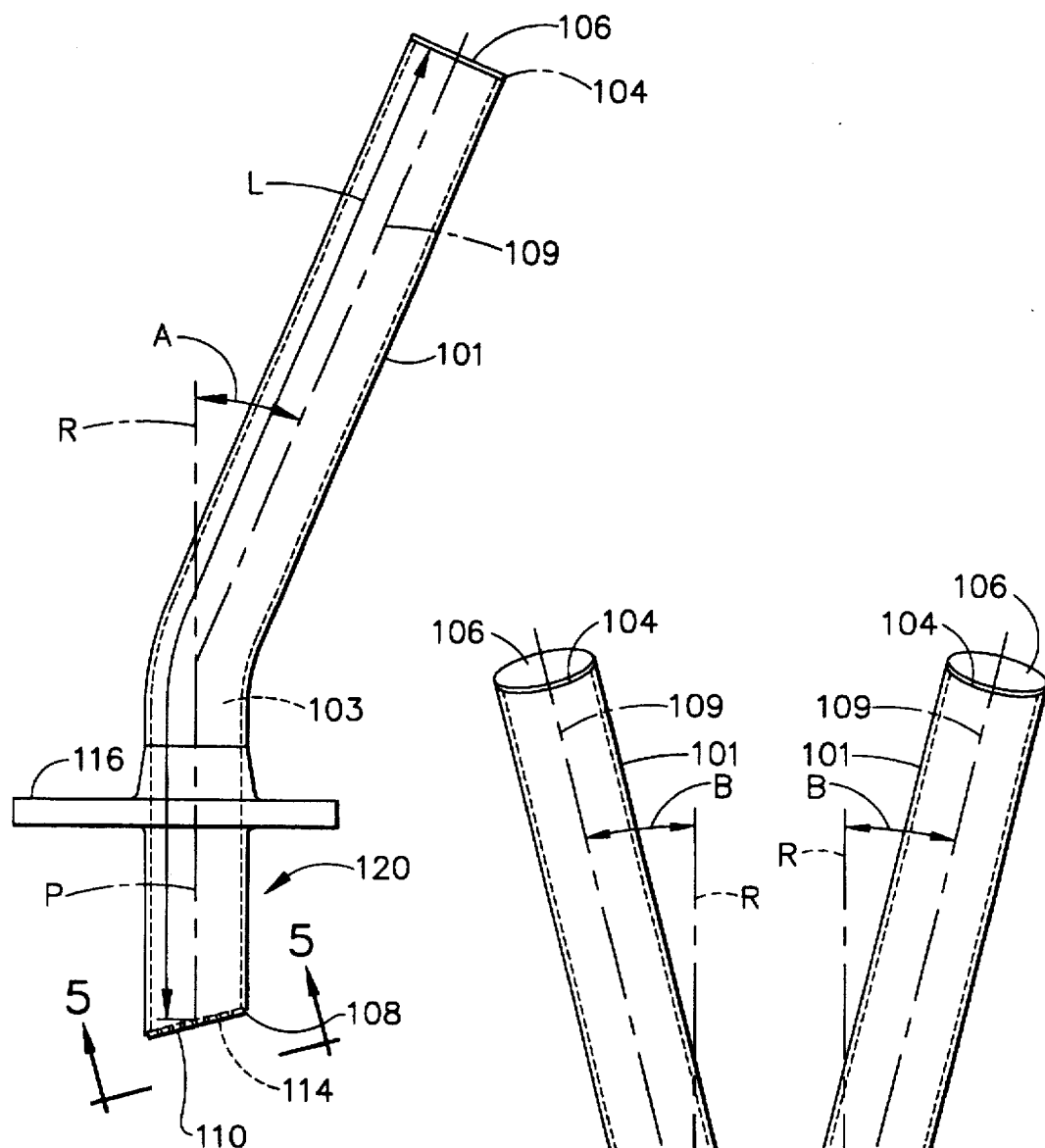
FIG. 2 is an enlarged and rotated cross-sectional view of the acoustic pressure oscillation attenuating apparatus in FIG. 1.
FIG. 3 is an aft looking forward cross-sectional view of the acoustic pressure oscillation attenuating apparatus in FIG. 2.

The apparatus 100 has a quarter wave resonator preferably, but not necessarily, in the form of a resonating tube 101 surrounding a resonator cavity 103 as is more clearly illustrated in FIG. 2. Referring now with more particularity to FIGS. 2, 3, 4, and 5, the resonating tube 101 is closed at a first end 104 by a flat reflecting end cap 106 and open at a second open end 108 and has a characteristic length L as measured along a centerline 109 of the tube 101 that reflects waves 180 degrees out of phase with the incoming waves off of the end cap. A viscous damper in the form of a damping plate 110 having apertures 114 is disposed across the open end 108 of the cavity 103 and resonating tube 101. The rapid movement of air in the immediate vicinity of the damping plate 110 in to and out of the resonator cavity 103 during dynamic pressure oscillations creates dissipative losses (viscous and eddy losses) which in conjunction with the quarter wave resonating tube 101 provides maximum dissipation at the interface. Therefore the acoustic energy contained in the incident wave is attenuated resulting in lower dynamic pressures in the combustor. The open end 108 and the damping plate 110 are essentially flush with the inside surface of the outer casing 24. It has been found that the damping plate 110 preferably should have an 8% porosity which is a ratio of the total open area of the apertures 114 to the total area of the damping plate 110. The resonating tube 101 operates somewhat better when straight but is slightly bent in the illustrated embodiment for installation purposes. A bend of about 27 degrees has been found to be acceptable. The tube 101 is bent about 27 degrees and is rotated in the circumferential direction with respect to the outer casing 24 (in FIG. 1) so as to have first angle component A in the axial direction and at a second angle component B in the circumferential direction as shown in FIGS. 2 and 3 with respect to a reference line R which is coextensive with an unbent portion P of the centerline 109. The bent tube 101 reduces the profile of the apparatus 100 thereby making it easier to package and mount on the engine.

Designing the characteristic length L is very important and is best accomplished using semi-empirical methods well known in the art to determine the wavelength of the acoustic pressure oscillations 80 which are to be attenuated. Determining which frequencies must be attenuated is usually done by a combination of past experience, empirical and semi-empirical modeling, and by trial and error. The exemplary embodiment of the present invention illustrated in the FIGS. is for a General Electric LM6000 DLE (dry low emission) gas turbine engine for which it has been found that a problem with acoustic pressure oscillations 80 exist in a frequency range of about 400–700 Hertz (Hz). The following formulas illustrate the calculation of the characteristic length L.

$f = C/l = C/4L$ $L = C/4f$ $f$ = oscillation frequency, HZ $C$ = Acoustic speed of sound in air contained within the tube, in ft/second $l$ = wavelength of the acoustic pressure oscillations, in ft $L$ = Characteristic Length, in ft.

An Example of the calculation for air temperature = 500 degrees F., $c = 1510$ Ft/sec The characteristic length L required to attenuate 425 HZ oscillation = $1510/(4 \times 425) = 0.89$ ft = 10.7"

An attenuating assembly 120 including a mounting means illustrated as a mounting plate 116 may be used to support more than one resonating tube 101 and preferably two tubes 101 which are disposed through the mounting plate. The mounting plate is adapted to be bolted, as indicated by bolts 115 disposed though bolt holes 117, to a boss 118 on the outer casing 24. The attenuating assembly 120 has the resonating tubes 101 mounted in a block 122 radially inward of the mounting plate 116. The block 122 is integral with or connected to the mounting plate 116 which in turn is mounted on the boss 118. The resonating tubes 101 may be easily fabricated from one inch diameter stainless steel tubing and the end cap 106 welded thereon. Assembly of the attenuating assembly 120 includes placing the resonating tubes 101 with bends already formed in the block 122, angling the resonating tubes 101 at a desired angle in the circumferential direction with respect to the outer casing 24, and welding the resonating tubes 101 to the block 122 or to the mounting plate 116.

Figure 3A:
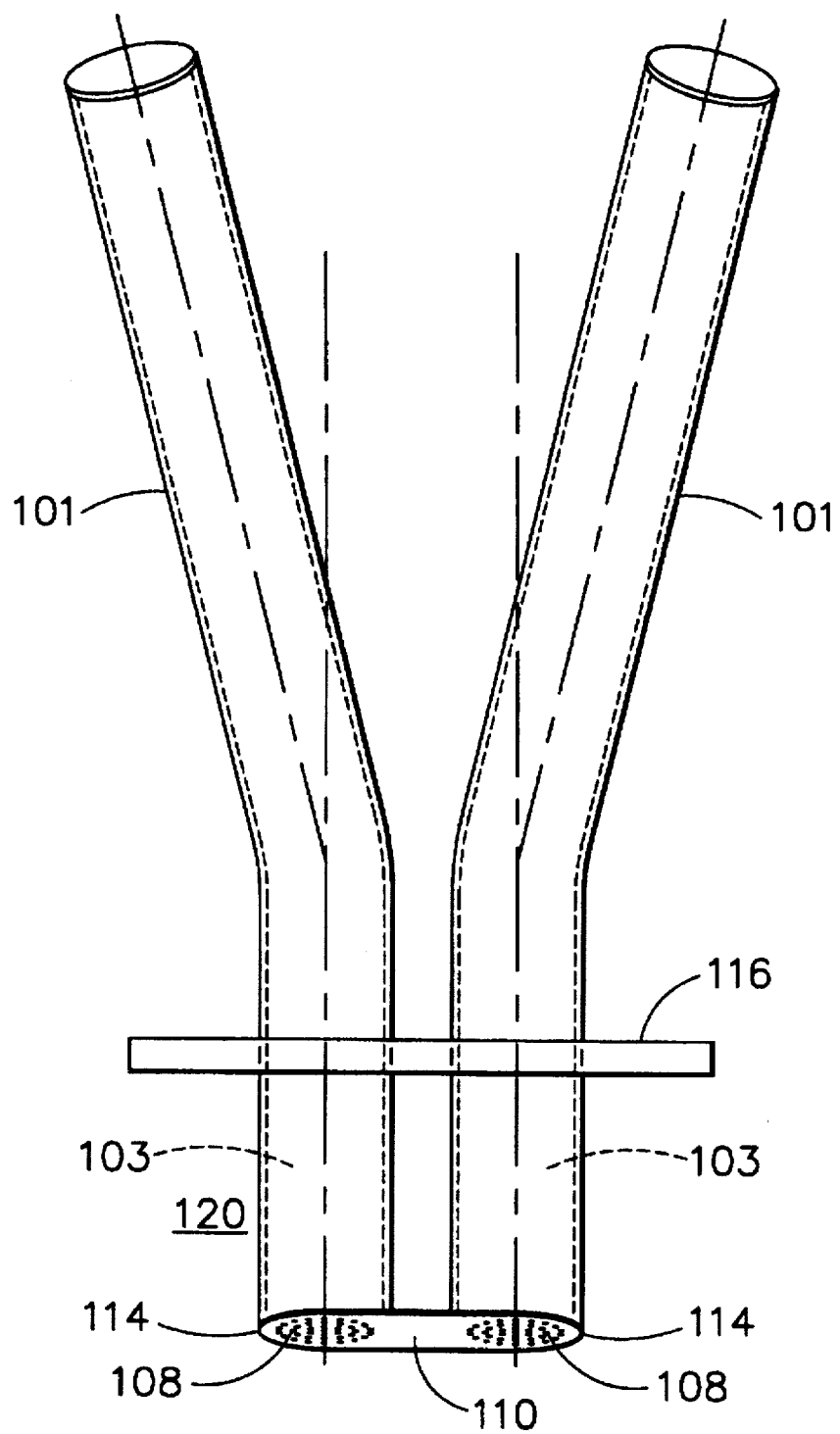
FIG. 3A is an aft looking forward cross-sectional view of an alternative acoustic pressure oscillation attenuating apparatus for use in a combustor section of an aircraft derivative industrial type gas turbine engine as illustrated in FIG. 1.
Figure 4:
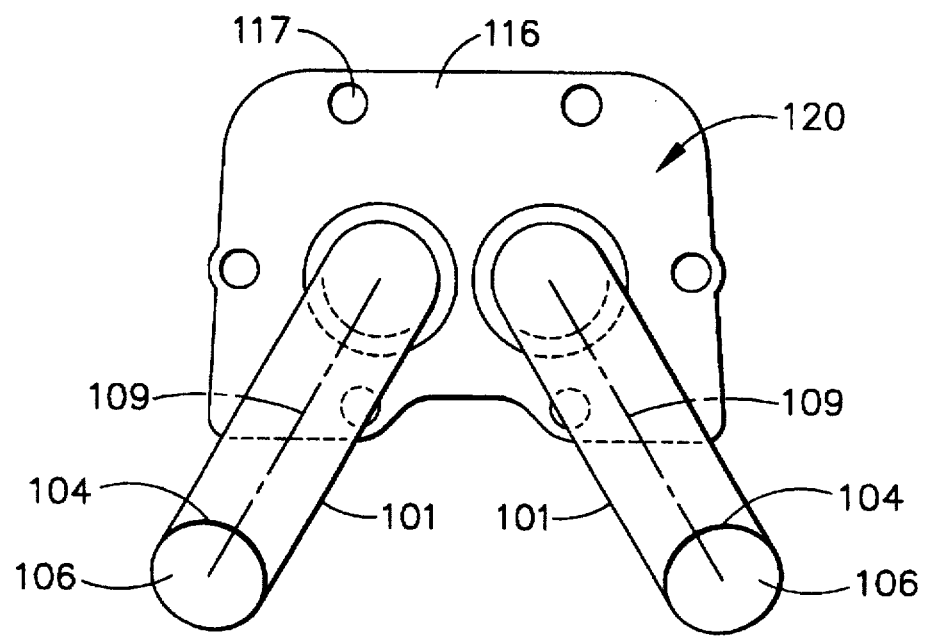
FIG. 4 is top looking down elevational view of the acoustic pressure oscillation attenuating apparatus in FIG. 3.
Figure 5:
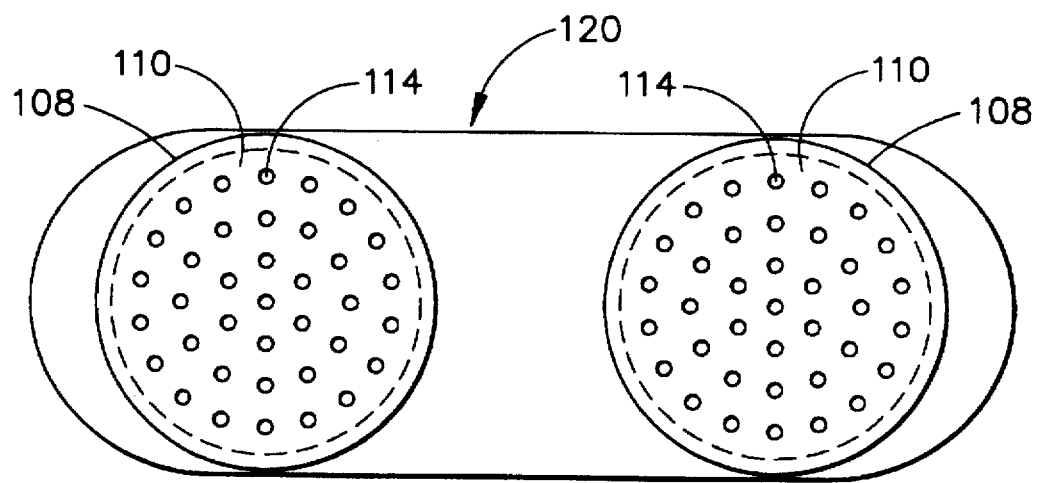
FIG. 5 is an elevational view taken along 5—5 of the viscous damper at the open end of the resonating tubes in FIG. 2.

Illustrated in FIG. 3A, is one alternative attenuating assembly 120 that uses the mounting plate 116 to support the two resonating tubes 101 without a block. The resonating tubes 101 are welded to the mounting plate 116 and to a single damping plate 110 that extends over the open ends 108 of the two resonating tubes 101 and has apertures 114 located across the open ends of the cavities 103 of the resonating tubes 101.

Figure 6:
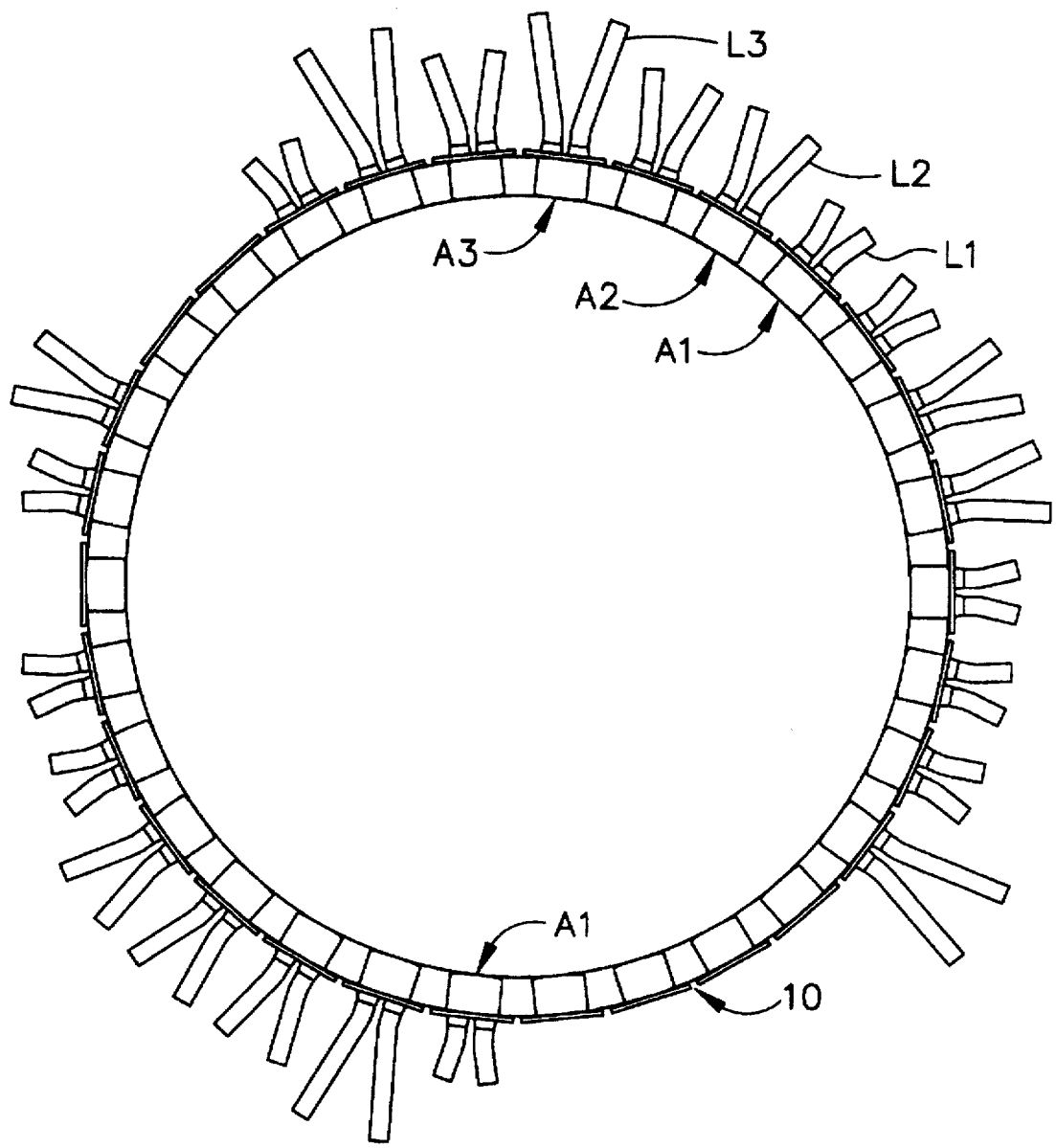
FIG. 6 is a schematic cross-sectional view of the combustor and acoustic pressure oscillation attenuating apparatus of the present invention in FIG. 1.

The present invention has another very distinct advantage where resonating tubes 101 having different characteristic lengths L may be used to attenuate different acoustic pressure oscillations 80 having different frequencies as illustrated in FIG. 6. First, second, and third sets A1, A2, and A3 respectively of the attenuating assemblies 120 have resonating tubes 101 with different characteristic lengths L correspondingly designated L1, L2, and L3. Other than the different characteristic lengths L the attenuating assemblies 120 in the different sets A1, A2, and A3 may be identical thereby reducing the manufacturing costs. It has been found that the same attenuating assemblies 120 with their different characteristic lengths L may also be used for different size engines. For example the General Electric LM6000 DLE gas turbine engine can use sets A1, A2, and A3 having 4, 9, and 10 attenuating assemblies 120 with the correspondingly different characteristic lengths L1, L2, and L3 equal to 10.5", 8.5", and 6.5" respectively. A General Electric LM2500 DLE gas turbine engine, substantially smaller than the LM6000, can use sets A1, A2, and A3 having 6, 3, and 3 attenuating assemblies 120, i.e having different numbers of attenuating assemblies 120 in each of the sets but with the same corresponding characteristic lengths L1, L2, and L3 equal to 10.5", 8.5", and 6.5" respectively. Being able to use the same size attenuating assemblies 120 on different size engines represents a significant cost advantage of the present invention.

While the preferred embodiment of our invention has been described fully in order to explain its principles, it is understood that various modifications or alterations may be made to the preferred embodiment without departing from the scope of the invention as set forth in the appended claims.

We claim:

1. An apparatus for attenuating acoustic oscillations of a gas flow contained in part by a combustor wall of a gas turbine engine combustor, said apparatus comprising:

at least one resonating tube with a closed end and an open end and a single cavity between said ends, a viscous damping means with a plurality of apertures therethrough is disposed across said open end, and a means for mounting said tube on the engine so that said viscous damping means and said apertures are essentially flush with the wall.

2. An apparatus as claimed in claim 1 wherein said viscous damping means comprises a damping plate disposed across said open end.

3. An apparatus as claimed in claim 2 wherein said apertures have a total open area that is about 8% of an inclusive area of said second open end wherein said damping plate is disposed across said open end.

4. An apparatus as claimed in claim 2 wherein said tube is cylindrical and said apertures are circular.

5. An apparatus as claimed in claim 4 wherein said apertures have a total open area that is about 8% of an inclusive area of said open end wherein said damping plate is disposed across said open end.

6. An apparatus as claimed in claim 2 further comprising a centerline of said resonating tube with a characteristic length extending from said closed end to said damping plate, said characteristic length being essentially equal to a quarter of a wavelength of an acoustic oscillation produced in the combustor and having a predetermined acoustic frequency.

7. An apparatus as claimed in claim 6 wherein said resonating tube has a bend.

8. An apparatus as claimed in claim 7 wherein said mounting means comprises a mounting plate supporting more than one of said resonating tube and said resonating tubes are disposed though said mounting plate which is adapted to be bolted to a boss on the engine.

9. A combustor for a gas turbine engine disposed between a diffuser outlet downstream of a compressor outlet guide vane stage and a turbine inlet guide vane stage, said combustor comprising:

an outer casing spaced apart from an inner casing and a combustion chamber therebetween, a combustor inlet at the diffuser outlet and a combustor outlet at the turbine inlet, an annularly disposed plurality of air/fuel mixture injectors radially disposed between said casings and axially disposed between said combustor inlet and said combustor outlet, an annularly disposed plurality of resonating tubes disposed around said combustion chamber, each of said tubes comprising;
      a closed end and an open end and a single cavity between said ends,
      a damping plate having a plurality of apertures therethrough disposed across said open end, and
      a means for mounting said tube on the engine so that said damping plate is essentially flush with said outer casing.

10. A combustor as claimed in claim 9 wherein said plurality of tubes has sets of said tubes and each tube within each set has an essentially linear centerline with a characteristic length extending from said closed end to said damping plate, said characteristic length being essentially equal to a predetermined quarter of a wavelength of an acoustic oscillation produced in the combustor and having a predetermined acoustic frequency and each set of tubes has a different characteristic length.

11. An apparatus as claimed in claim 10 wherein said each resonating tube has a bend.

12. A combustor as claimed in claim 11 wherein said mounting means comprises a mounting plate having more than one of said resonating tubes mounted therethrough and said mounting plate is adapted to be bolted to a boss on the engine.

13. A combustor for a gas turbine engine disposed between a diffuser outlet downstream of a compressor outlet guide vane stage and a turbine inlet guide vane stage, said combustor comprising:

an outer casing spaced apart from an inner casing and a combustion chamber therebetween, a combustor inlet at the diffuser outlet and a combustor outlet at the turbine inlet, an annularly disposed plurality of air/fuel mixture injectors radially disposed between said casings and axially disposed between said combustor inlet and said combustor outlet, an annularly disposed plurality of resonating tubes disposed around said combustion chamber, each of said tubes comprising;
      a closed end and an open end and a single cavity between said ends,
      a damping plate having a plurality of apertures therethrough disposed across said open end,
      a means for mounting said tube on the engine so that said damping plate is essentially flush with said outer casing, and
      wherein said annularly disposed plurality of resonating tubes is axially disposed between said plurality air/fuel mixture injectors and said combustor inlet.

14. A combustor as claimed in claim 13 wherein said apertures have a total open area that is about 8% of an inclusive area of said open end wherein said damping plate is disposed across said open end.

15. A combustor as claimed in claim 13 wherein said plurality of tubes has sets of said tubes and each tube within each set has an essentially linear centerline with a characteristic length extending from said closed end to said damping plate, said characteristic length being essentially equal to a predetermined quarter of a wavelength of an acoustic oscillation produced in the combustor and having a predetermined acoustic frequency and each set of tubes has a different characteristic length.

16. An apparatus as claimed in claim 15 wherein said each resonating tube has a bend.

17. A combustor as claimed in claim 16 wherein said mounting means comprises a mounting plate having more than one of said resonating tubes mounted therethrough and said mounting plate is adapted to be bolted to a boss on the engine.

18. A combustor as claimed in claim 17 wherein said apertures have a total open area that is about 8% of an inclusive area of said open end wherein said damping plate is disposed across said open end.

19. A combustor as claimed in claim 16 wherein said apertures have a total open area that is about 8% of an inclusive area of said open end wherein said damping plate is disposed across said open end.

20. A combustor as claimed in claim 19 wherein said mounting means comprises a mounting plate having more than one of said resonating tubes mounted therethrough and said mounting plate is adapted to be bolted to a boss on the engine.

* * * * *